US012262235B2

(12) United States Patent
Yang

(10) Patent No.: US 12,262,235 B2
(45) Date of Patent: Mar. 25, 2025

(54) BEAM MEASUREMENT METHOD, NETWORK DEVICE, AND USER EQUIPMENT

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 662 days.

(21) Appl. No.: 17/166,684

(22) Filed: Feb. 3, 2021

(65) Prior Publication Data

US 2021/0160724 A1    May 27, 2021

Related U.S. Application Data

(63) Continuation of application No. PCT/CN2019/101644, filed on Aug. 20, 2019.

(60) Provisional application No. 62/720,738, filed on Aug. 21, 2018.

(51) Int. Cl.
*H04W 24/10* (2009.01)
*H04B 7/06* (2006.01)
*H04B 17/391* (2015.01)

(52) U.S. Cl.
CPC .......... *H04W 24/10* (2013.01); *H04B 7/0686* (2013.01); *H04B 17/391* (2015.01)

(58) Field of Classification Search
None
See application file for complete search history.

(56) References Cited

U.S. PATENT DOCUMENTS

| 2011/0183661 | A1 | 7/2011 | Yi et al. | |
|---|---|---|---|---|
| 2016/0142961 | A1 | 5/2016 | Schmidt et al. | |
| 2017/0318491 | A1 | 11/2017 | Chen et al. | |
| 2018/0048375 | A1 | 2/2018 | Guo et al. | |
| 2019/0110300 | A1* | 4/2019 | Chen | H04W 74/02 |
| 2019/0132778 | A1* | 5/2019 | Park | H04W 24/10 |
| 2019/0223043 | A1* | 7/2019 | Geng | H04L 5/0051 |

(Continued)

FOREIGN PATENT DOCUMENTS

| CN | 107889130 A | 4/2018 |
|---|---|---|
| CN | 109089269 A | 12/2018 |

(Continued)

OTHER PUBLICATIONS

International Search Report for PCT/CN2019/101644 mailed Nov. 20, 2019.

(Continued)

*Primary Examiner* — Steve R Young
(74) *Attorney, Agent, or Firm* — Young Basile Hanlon & MacFarlane, P.C.

(57) ABSTRACT

Methods for beam measurement are provided. The method includes: receiving, by a user equipment (UE), beam measurement configuration from a network device, and the beam measurement configuration being indicative of beam measurement and logging by the UE in an idle mode or an inactive mode; and performing, by the UE in the idle mode or the inactive mode, measuring on at least one beam based on the beam measurement configuration and logging beam measurement results in the UE.

8 Claims, 3 Drawing Sheets

(56) References Cited

U.S. PATENT DOCUMENTS

| | | | |
|---|---|---|---|
| 2020/0022040 A1* | 1/2020 | Chen | H04W 36/0085 |
| 2020/0045725 A1 | 2/2020 | Mochizuki et al. | |
| 2020/0359245 A1* | 11/2020 | Da Silva | H04L 5/0051 |
| 2021/0120448 A1* | 4/2021 | Zhang | H04W 76/18 |

FOREIGN PATENT DOCUMENTS

| | | | |
|---|---|---|---|
| EP | 3627876 A1 | 3/2020 | |
| WO | 2018117248 A1 | 6/2018 | |

OTHER PUBLICATIONS

Extended European Search Report for EP Application 19853151.9 mailed Oct. 11, 2021. (15 pages).

Communication pursuant to Article 94(3) EPC for EP Application 19853151.9 mailed Jun. 21, 2023. (12 pages).

\* cited by examiner

BEAM MEASUREMENT METHOD, NETWORK DEVICE, AND USER EQUIPMENT

CROSS-REFERENCE TO RELATED APPLICATION(S)

The present application is a continuation application of International Application No. PCT/CN2019/101644, filed on Aug. 20, 2019, which claims priority to U.S. provisional application No. 62/720,738, filed on Aug. 21, 2018. The present application claims priority and the benefit of the above-identified applications and the above-identified applications are incorporated by reference herein in their entireties.

TECHNICAL FIELD

This application relates to wireless communication, and more particularly to beam measurement in an idle/inactive mode in new radio (NR).

BACKGROUND

Along with the continuous development of wireless communication technology, requirements of a wireless communication system on coverage and wireless bandwidths for transmission have gradually increased and the wireless communication system may ensure coverage capabilities of networks through a beam-forming technology.

The beam-forming technology refers to an antenna array-based signal pre-processing technology that generates a directional beam by adjusting a weighting coefficient of each array element in an antenna array to obtain a significant array gain. In the beam-forming technology, after a terminal access a cell, a network device to which the cell belongs allocates a beam suitable for data transmission at the terminal for the terminal.

In new radio (NR) system, there would be multiple beams in one cell, and those beams are visible to the user equipment. When network provides measurement configuration to the UE, not only the cell related configurations but also the beam related configurations may be provided to the UE. In this case, UE will perform the measurement on cell level and/or beam level, and report the measurement results to the network.

UE in a wireless communication may have multiple operating modes, including a connected or active operating mode and an idle or inactive operating mode. It would be desirable if the network could receive measurement results from the UE.

SUMMARY

According to a first aspect of the disclosure, a method for beam measurement is provided, and the method is applicable to UE. UE receives a beam measurement configuration from a network device in a connected mode, where the beam measurement configuration is indicative of beam measurement by the UE in an idle mode or an inactive mode. When the UE is in the idle mode or the inactive mode, beam measurement is performed on at least one beam according to the beam measurement configuration.

According to a second aspect of the disclosure, a method for beam measurement is provided, in which a network device transmits beam measurement configuration is transmitted to user equipment (UE), the beam measurement configuration is indicative of beam measurement by the UE in an idle mode or an inactive mode.

According to a third aspect of the disclosure, user equipment is provided. The UE includes a processor; and a memory, coupled with the processor and configured to store program codes which, when executed by the processor, are operable with the processor to perform the method for beam measurement of the first aspect.

According to a fourth aspect of the disclosure, a network device is provided. The network device includes a processor; and a memory, coupled with the processor and configured to store program codes which, when executed by the processor, are operable with the processor to perform the method for beam measurement of the second aspect.

According to a fifth aspect of the disclosure, a computer readable storage medium is provided. The computer readable storage medium is configured to store programs which, when executed by a computer, are operable with the computer to perform the method of the first aspect.

According to a sixth aspect of the disclosure, a computer readable storage medium is provided. The computer readable storage medium is configured to store programs which, when executed by a computer, are operable with the computer to perform the method of the second aspect.

According to a seventh aspect of the disclosure, a UE is provided. The UE includes a receiving unit and a measuring unit. The receiving unit is configured to receive beam measurement configuration from a network device, where the beam measurement configuration is indicative of beam measurement by the UE in an idle mode or an inactive mode. The measuring unit is configured to perform measurement on at least one beam based on the beam measurement configuration, when the UE in the idle mode or the inactive mode.

According to an eighth aspect of the disclosure, a network device is provided. The network device includes a transmitting unit, which is configured to transmit a beam measurement configuration to user equipment (UE), the beam measurement configuration is indicative of beam measurement by the UE in an idle mode or an inactive mode.

Features and details of the forging aspects and respective implementations thereof can be combined or substituted with each other without conflicts.

BRIEF DESCRIPTION OF DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. The same reference numerals are used throughout the drawings to reference like components or features.

DETAILED DESCRIPTION

Figure 1:
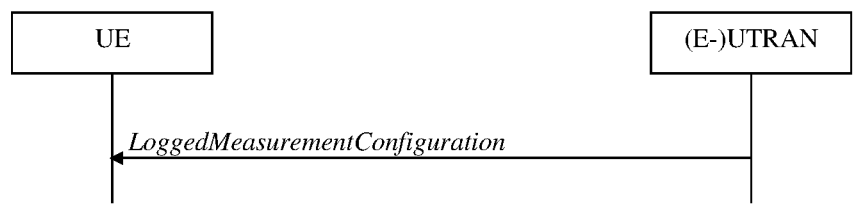
FIG. 1 is a schematic diagram of logged MDT in LTE.

For illustrative purpose, specific exemplary implementations will now be explained in detail below in conjunction with the figures.

The implementations set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and nonvolatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The user equipment (UE) in a wireless communication system may have multiple operating modes or states, for which different naming may be possible in different implementations. For example, the operating modes includes a connected or active operating mode (in the following, "connected mode" or "radio resource control (RRC) connected mode" for short), a standby or idle operating mode (in the following, "idle mode" for short), and an inactive mode (also known as "RRC inactive mode").

Generally, in the connected mode, UE remains in connection with the 5G-RAN/5GC for example. Specifically, in this mode, a connection such as a RRC connection is established between UE and a network such as an evolved terrestrial radio access network (E-UTRAN), all UE functions are available, and the UE may transmit or receive communication signals or otherwise being used by a user, for example.

The idle mode is illustrative of an operating mode in which a connection such as a RRC connection is not established. For example, upon power ON, UE enters into the idle mode. UE can move to the idle mode from either the connected mode or the inactive mode.

UE can move to the inactive mode from the connected mode. In this mode, UE context is still kept in the network and UE as UE is connected but performing cell re-selection as idle for minimizing signaling and power consumption. The inactive mode could be useful for conserving power, for example, but requires a connection to the wireless communication system to be resumed before communication signals can be transmitted or received.

In new radio (NR), network side could get from the UE full measurement results which are acquired based on measurement configuration and reporting configuration, when the UE is in the connected mode. However, there is no way for the network to obtain the measurement results from the UE in the idle mode or inactive mode.

In long term evolution (LTE), one mechanism named as logged minimization of drive tests (logged MDT) has been specified for cell level measurement. The logged MDT is performed when the UE is in the idle mode and is a type of MDT where the UE stores the cell level measurement result for a certain period of time before the measurement result is reported or logged to the network. For this mechanism, for example, UE will be configured by the network during release procedure. As illustrated in FIG. 1, Logged measurement configuration is transmitted from a network device to the UE. After that, UE will store measurement results in the idle mode based on the MDT configuration. And when the UE accessing to the network for some reason, e.g. data transmission, or tracking area update, UE will indicate the availability of the measurement results, and then network can retrieve the measurement results from the UE.

However, for the logged MDT mechanism, only cell level measurement results have been defined together with UE position information if available, and the beam level measurement results are unavailable for the network.

Taking the above into consideration, the present disclosure herein defines the details of beam level measurement results reporting in the idle mode or inactive mode in NR.

Figure 2:
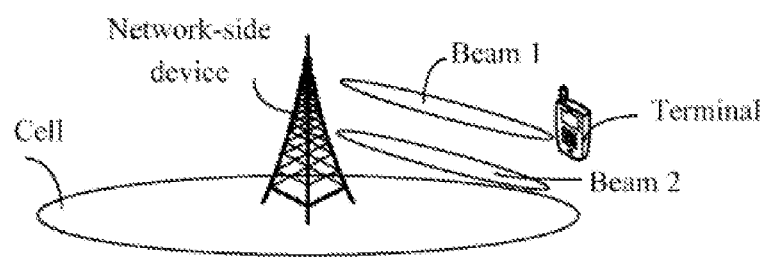
FIG. 2 is a schematic diagram illustrating a scenario of beam measurement.
Figure 3:
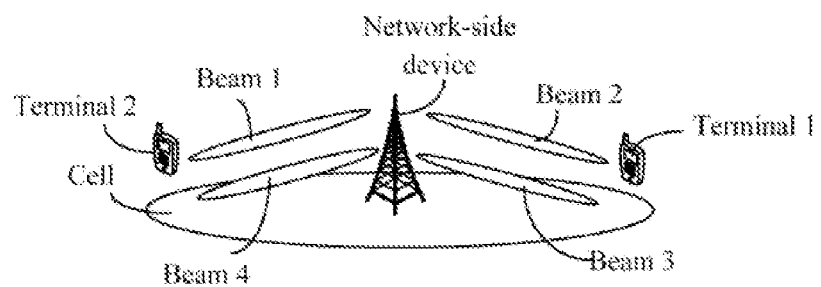
FIG. 3 is schematic diagram illustrating another scenario of beam measurement.

Turning now to FIG. 2 and FIG. 3, some scenarios where the beam measurement scheme provided herein can be implemented are illustrated.

FIG. 2 is a schematic diagram illustrating an application scenario of the beam measurement scheme. As illustrated in FIG. 2, in a cell, there are multiple beams (Beam 1 and Beam 2) for data transmission of a data channel. Additionally, there may be a beam (not illustrated) for signaling transmission of a control channel. Thus, one cell can be covered by a "wide beam" for control channel and multiple "narrow beams" for data channel.

FIG. 3 is schematic diagram illustrating another application scenario of the beam measurement scheme. Different from FIG. 2, in FIG. 3, in the cell illustrated, there are (i) multiple "narrow beams" (Beam 1 and Beam 2) for control signaling transmission of a control channel, through which a terminal device can interchange signaling with a network-side device (also known as "network device"), and (ii) multiple "narrow beams" (Beam 3 and Beam 4) for data transmission of a data channel, through which the terminal device can interchange data with the network device. For example, Terminal A may interchange control signaling with a network device through beam 2 and transmit/receive data transmission with the network device through Beam 3. Terminal B may interchange control signaling with the network device through Beam 1 and perform data transmission with the network device through Beam 4.

In FIG. 3, the narrow beams for control signaling transmission of a control channel are shown as different from the narrow beams for data transmission of a data channel. However, the foregoing narrow beams may be the same beams.

The system architecture of FIG. 2 and FIG. 3 can work in the high frequency band and can be a LTE system, 5G system, NR system, M2M (Machine to Machine) system, and the like. The system architecture illustrated is also applicable in further system development.

Figure 4:
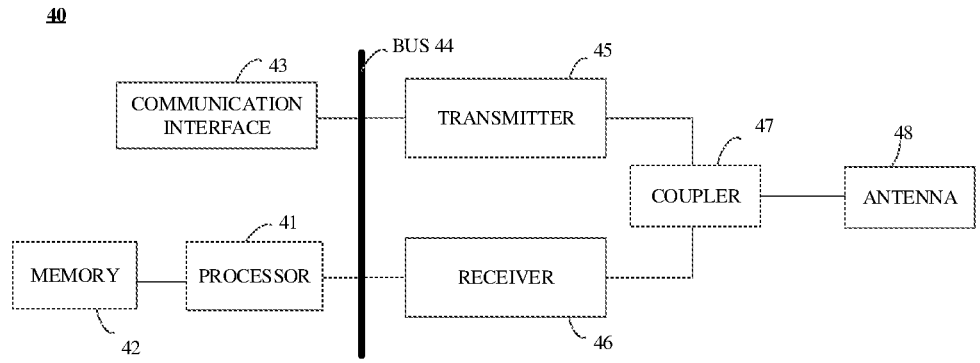
FIG. 4 is block diagram illustrating structures of a network device/UE involved herein.

The network device can be eNB or gNB. As illustrated in FIG. 4, the network device 40 includes one or more processors 41, a memory 42, a communication interface 43, a transmitter 45, and a receiver 46. These components may be connected via a bus 44 or other means. As illustrated in FIG. 4, the network device 40 may further include a coupler 47 and an antenna 48 connected to the coupler 47.

Transmitter 45 may be used to transmit signals output from processor 41. Signal modulation may also be performed at transmitter 45. In implementations of the signal transmission of the disclosure, the transmitter 45 can be configured to transmit control message in various manners given later. Receiver 46 can be used for receiving and/or processing of signals received from outside via antenna 48. Signal demodulation can be done at receiver 46. In some implementations, the transmitter 45 and the receiver 46 can be considered as a wireless modem. In the network device 40, more than one transmitter 45 can be provided. Similarly, more than one receiver 46 can be provided.

Processor 41 can be responsible for wireless channel management, communication link establishment, and cell switching control for users within a control area. Processor 41 can also read and execute computer readable instructions such as those stored in memory 42, which is coupled thereto. Memory 42 is configured to store various software programs and/or instructions, operating systems, and network communication programs or protocols. Memory 42 may include high speed random access memory (RAM), and can also include non-transitory memory, such as one or more disk storage devices, flash memory devices, or other nonvolatile solid-state storage devices. In one implementation, in the network device, the memory 42 is coupled with the processor 41 and configured to store program codes which, when executed by the processor 41, are operable with the processor to perform the beam measurement method provided herein, such as the beam measurement method performed by the network device, which is detailed below.

It should be noted that, the structure illustrated in FIG. 4 can be equally applies to terminals which communicates with the network device. For example, in case of a UE with the structure illustrated in FIG. 4, in the UE 40, the receiver 46, the communication interface 43, and/or the antenna 48 can be configured to receive the control message from the network device, the receiver 46 may further demodulate the information and forward the demodulated information to the processor 41 for a subsequent process or may store the demodulated information in the memory 42. In one implementation, in the UE 40, the memory 42 is coupled with the processor 41 and configured to store program codes which, when executed by the processor 41, are operable with the processor to perform the beam measurement method provided herein, such as the beam measurement method performed by the UE, which is detailed below.

Based on the above structures and with the understating that the principles of the disclosure can apply more generally to any wireless communication environment, the beam measurement/report method in an idle mode or an inactive state of a UE in NR will be described. The method focuses on beam level measurement by the UE in an idle state or inactive state and measurement result report by the UE in a connected state. The term "beam measurement" or "beam level measurement" is used to distinguish from "cell measurement" or "cell level measurement" and means that the measurement is performed per beam basis. The following sections of the disclosure contribute to its advantages, and each will be described in detail below.

Network Side

Figure 5:
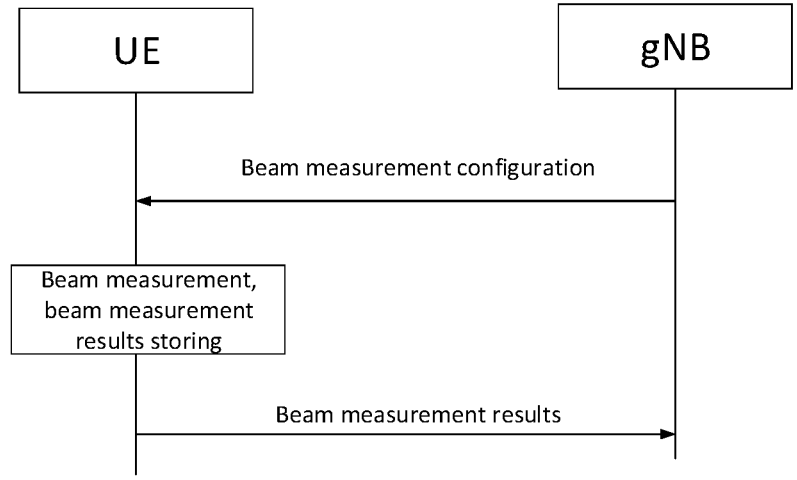
FIG. 5 is a schematic diagram of a method for beam measurement in NR according to implementations of the present disclosure.

According to implementations of the present disclosure, a method for beam measurement is provided. FIG. 5 is a schematic diagram illustrating the communication between a network device and UE, for example, between gNB and UE.

As illustrated in FIG. 5, the gNB transmits beam measurement configuration to UE. The beam measurement configuration is indicative of beam measurement by the UE in an idle mode or an inactive mode. The UE in the idle mode or the inactive mode means that UE enters into or stays in the idle mode or the inactive mode. Format and structure of the beam measurement configuration can be designed according to the signaling carrying the beam measurement configuration and is not limited herein.

In one implementation, the beam measurement configuration is transmitted via a system message or specified signaling, such as radio resource control (RRC) connection configuration signaling/message, RRC connection release signaling/message, and the like.

In one implementation, in addition to beam measurement, the beam measurement configuration is further indicative of beam measurement results reporting by the UE when the UE enters into a connected mode again. In this case, the beam measurement configuration can be comprehended as a combination of a measurement configuration and a reporting confirmation.

When the network provides the configuration to the UE, if the network would like the UE to log beam measurement results, the beam measurement configuration could also be configured with at least one of the following.

An indicator for indicating measurement of at least one beam and storage of beam measurement results.

An indicator for indicating deletion of beam measurement results.

Maximum number of beams measured for a specific cell or each cell.

Threshold for evaluating beam qualification.

Indicator for indicating measurement of at least one beam and storage of beam measurement results Once such indicator is phrased from the beam measurement configuration, the UE will conduct beam measurement and store the beam measurement results. The beam measurement results will be logged to the network when the UE accessing to the network.

As one example, the indicator may further indicate that the beam measurement is performed on cell basis, and the beam measurement results are stored for each cell. In this case, the UE will store beam measurement results corresponding to each cell. Alternatively, if the beam measurement configuration further includes a cell identifier (ID), it indicates that the beam measurement is cell-specific and beam measurement will be conducted for a cell corresponding to the cell ID only.

Besides, the indicator can be just one bit, and UE could perform the beam measurement based on the default/pre-configured configuration or configuration provided via broadcast signaling.

The beam measurement results can be various. For example, it can be beam index of all beams measured, beam index of all beams qualified, beam related parameters, and the like. The beam related parameters can be signal strength or signal quality related, such as reference signal received power (RSRP), reference signal received quality (RSRQ), signal to interference and noise ratio (SINR), and so on.

Indicator for Indicating Deletion of Beam Measurement Results

For the indicator for indicating deletion of beam measurement results, for example, deletion of beam measurement results corresponding to a specific cell, it can be separated from or integrated with the indicator for indicating measurement of at least one beam and storage of beam measurement results, the design of which is not limited herein. According to the indicator for indicating deletion of beam measurement results, UE will delete the measurement results (all measurement results or measurement results of a specific cell for example) after it is reported to the network device. Alternatively, measurement results stored at UE can be deleted or updated in a default manner, such as based on buffer limits, a timer, and so on.

Maximum number of beams measured for a specific cell or each cell.

For instance, the gNB can configure that at most 3 beams are to be measured for one cell.

Threshold for Evaluating Beam Qualification

After beam measurement, UE can further evaluate which beam is qualified according to the beam measurement results, for example, one beam can be evaluated as a qualified beam if the beam measurement result thereof is greater than the threshold in terms of RSRP, RSRQ, SINR and the like, here the threshold can be deemed as an absolute threshold. On the other hand, a relative threshold is also applicable for beam qualification evaluation. With the relative threshold, for a beam, variations in terms of RSRP, RSRQ, SINR and the like will be taken into consideration.

Time and Area for Beam Measurement

The network can configure where and when the beam measurement will be conducted. As one implementation, the time can be indicated by a timer, in this case, when the timer expires, the UE will stop beam measurement. Still another example, the time can be expressed as a time window in which beam measurement will be conducted. Alternatively, in addition to or instead of the timer or time window, measurement frequency, measurement cycle, and/or measurement duration can be used as the time information. For example, the UE can be instructed to conduct beam measurement in a time window at a certain measure interval.

In terms of area of measurement, it can be cell-based, when the UE moves out of a specific area such as a cell or a cell group, UE will stop beam measurement.

In addition to those mentioned above, the beam measurement configuration may contain other beam measurement related information. For example, the beam measurement configuration may further contain ID or index of the beam to be measured, ID of a beam group to which the beam belongs, ID of a cell corresponding to the beam, ID of an access point corresponding to the beam, ID of a base station corresponding to the beam, measurement mode, report mode, beam resource related parameter or information of a reference signal corresponding to the beam.

As such, information contained in the beam measurement configuration can be beam related, cell related, or base station related. It is to be understood that the beam, the beam group, the cell, the access point, and the base station are introduced herein from different perspectives. For example, information in the beam measurement configuration may be applicable to one or multiple beams, and ID of the beam may be contained therein. As another example, information in the beam measurement configuration may be applicable to all beams in one or multiple cells and accordingly, ID of the cell may be contained therein, and so on.

Alternatively, the information listed above can be specified in the specification or standard of communication industry. When the beam measurement configuration is applied to multiple beams, since measurement duration is related to a sweeping duration of a beam and measurement duration of each beam in a system may be the same, instead of being contained in the beam measurement configuration to the transmitted to the UE, the measurement duration can be specified in the standard or set as a default value.

Once the beam measurement configuration is received at UE via dedicated signaling or broadcast signaling, the UE, which enters or stays in the idle state or the inactive state, will conduct beam measurement on at least one beam according to the beam measurement configuration, to obtain beam measurement results. If the beam measurement configuration still indicative of measurement reporting in a connected mode, the UE will report the beam measurement results to the network (that is, the network device gNB) when the UE enters the connected mode.

The beam measurement results comprise at least one of: beam related parameters (such as RSRP, RSRQ, SINR); beam index of qualified beams for a cell; and qualified beams number corresponding to the cell. The beam index can be in some order (e.g. descending order) to facilitate decoding at the network device.

UE Side

The foregoing methods have been described from the perspective of the gNB. In the following, methods provided herein will be further described from the perspective of the UE. For ease of explanation, details relating to principles of the disclosure, which is adapted to both the gNB and UE, will not be repeated to avoid redundancy.

In the method for beam measurement at the UE side, the UE receives beam measurement configuration from the network device such as the gNB as illustrated in FIG. 5. As mentioned above, the beam measurement configuration is indicative of beam measurement by the UE in the idle mode or the inactive mode. The beam measurement configuration may further indicative of beam measurement results reporting by the UE when the UE enters a connected mode.

In one implementation, the beam measurement configuration contains at least one of: an indicator for indicating measurement of at least one beam and storage of beam measurement results corresponding to a cell; an indicator for indicating deletion of beam measurement results; maximum number of beams measured for a cell; threshold for evaluating beam qualification; at least one of time and area for beam measurement. The threshold used herein can be an absolute threshold or relative threshold.

The UE, which is in an idle state or inactive state, performs beam level measurement on at least one beam to obtain the beam measurement results, according to the beam measurement configuration. UE can cache the beam measurement results in butter for example, and report the beam measurement results to the network device when the UE enters into the connected state, if the beam measurement configuration indicates such reporting.

As mentioned above, according to the configuration received, the beam measurement can be conducted at UE on beam basis, cell basis, or even beam group basis or cell group basis. Accordingly, the beam measurement results storing and reporting may also be based on beam, beam group, cell, or cell group. For example, if the beam measurement configuration contains a cell ID, then the UE will ware that the beam measurement is to be conducted on a beam(s) of a cell corresponding to the cell ID. Alternatively, the cell on which beam measurement is conducted can be specified by default as the cell that the UE currently resident.

The beam measured can be at least one beam configured for signaling transmission of a control channel and/or a beam configured for data transmission of a data channel. The beam configured for signaling transmission of the control channel and the beam configured for data transmission of the data channel may be the same or different beams. In case that multiple beams are to be measured, these beams may correspond to one cell or different cells.

Turning to FIG. 3 again, the beam measurement configuration may indicative of measurement of Beam 1, Beam 2, and Beam 3 of FIG. 3 by including respective IDs of these beams. Still another example, the beam measurement configuration may indicative of one or more cells by including ID of the cell or IDs of multiple cells. In this case, the UE will measure all beams corresponding to the cell or the multiple cells. In one implementation, the multiple cells can be adjacent cells with one of them being a serving cell. Alternatively, the beam measurement configuration may indicative of beam measurement in one or more beam groups or cells which meet some predetermined requirements in terms of signal quality, signal strength, and the like, and the UE will only measure beams meeting the requirements. In short, the beams to be measured can be indicated in various manners and is not limited herein.

During beam measurement, the UE can store the beam measurement results in real time or periodically. For instance, UE can store the beam measurement results for some specific cell in real time or periodically, according to the beam measurement configuration for example. If the measurement results stored exceed UE's buffer limit, UE will stop the measurement, or UE will replace the old measurement result with new measurement result. The old measurement result refers to a result which is obtained earlier and has been stored in the buffer for a relatively long time than other results stored. Alternatively, UE can decide whether to delete the measurement results stored or delete some specific measurement result corresponding to a specific cell, according to the foregoing indicator indicative of deletion of measurement results, if any. For instance, the measurement results can be deleted after being reported to the network device.

When the UE switches to a connected mode, that is, when the UE is accessing the network, the UE can report the beam measurement results to the network.

The beam measurement configuration may further include time information or area location indicating when and where beam measurement is conducted. The time can be indicated by a timer, in this case, when the timer expires, the UE will stop beam measurement. Still another example, the time can be expressed as a time window in which beam measurement will be conducted. When the UE is in a mobile state and moves out of the area indicated in the beam measurement configuration, the beam measurement will stop.

Specifically, when the UE accessing to the network, UE will report the beam measurement results to the network according to the report mode indicated in the beam measurement configuration, if any, or report in a default manner. In addition to or alternatively, UE will indicate whether beam measurement results corresponding to a specific cell are available to the network or even which beam measurement result is available. Correspondingly, the gNB will try to acquire the beam measurement results from the UE with dedicated signaling. With the beam measurement results thus obtained, network can configure the UE more efficiently.

The beam measurement results reported from the UE can include at least one of the following.

Beam related parameters. Such as the RSRP, RSRQ, SINR and the like.

Beam index of qualified beams for a specific cell or each cell. In case that the beam measurement configuration comprises the threshold for evaluating beam qualification, the UE can determine which beam is a qualified beam according to the threshold. The threshold can be based on beam quality or beam strength and accordingly, the beam index can be arranged in a descending order of beam quality or strength for example.

Number of qualified beams for a specific cell or each cell. The specific cell can be the cell where the UE is currently resident.

Target beam, target beam group, or target cell that UE can resident. The target beam, target beam group, or target cell can be selected at the UE according to the beam related parameters obtained through beam measurement.

The foregoing beam measurement result examples are for illustrative purpose only, and what kind of result is reported as well as how such result is reported to the gNB can vary according to network configuration.

As described, this disclosure provides methods and equipment for beam level measurement and report. With aid of the above, the network can configure the UE to conduct beam level measurement in an idle state and report beam level measurement result in a connected state, and the UE can report to the network availability on beam level measurement results or which beam level measurement result is available. The term "beam level" used herein is to distinguish from "cell level".

One of ordinary skill in the art can understand that all or part of the process for implementing the above implementations can be completed by a computer program to instruct related hardware, and the program can be stored in a non-transitory computer readable storage medium. In this regard, according to implementations of the disclosure, a non-transitory computer readable storage medium is provided. The non-transitory computer readable storage medium is configured to store at least one computer readable program which, when executed by a computer, cause the computer to carry out all or part of the operations of the method for beam measurement at the network device, or the method for beam measurement at the UE. Examples of the non-transitory computer readable storage medium include but are not limited to read only memory (ROM), random storage memory (RAM), disk or optical disk, and the like.

Network Device

Figure 6:
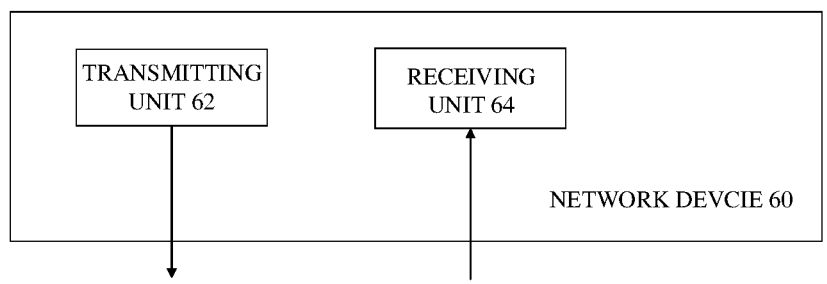
FIG. 6 is a block diagram illustrating a network device according to implementations of the present disclosure.

Implementations further provide a network device, which is applicable to perform the method for beam measurement provided herein, such as the method described in section Network side. FIG. 6 is a block diagram illustrating the network device 60. As illustrated in FIG. 6, network device 60 includes a transmitting unit 62. The network device 60 may further include a receiving unit 64. The transmitting unit 62 can be structured as a transmitter, a transmitting antenna, a transmitting circuit, or other component equipped with a transmission function. The receiving unit 64 can be structured as a receiver, a receiving antenna, a receiving circuit, or other component equipped with a reception function. The transmitting unit 62 and the receiving unit 64 can also be integrated into a transceiver.

Figure 7:
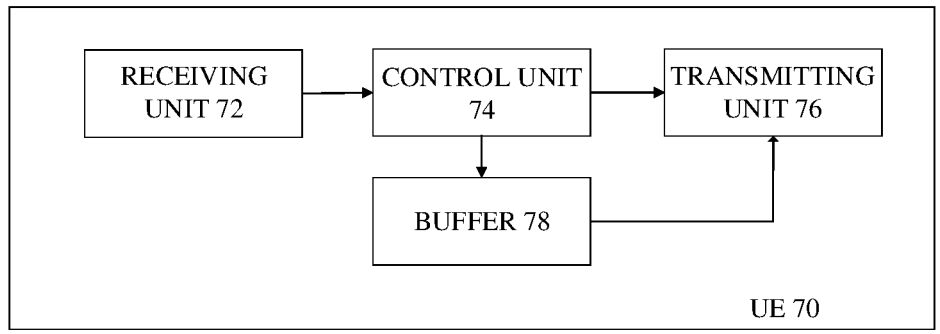
FIG. 7 is a block diagram illustrating a UE according to implementations of the present disclosure.

The transmitting unit 62 is configured to transmit a beam measurement configuration to a UE, such as the UE 70 illustrated in FIG. 7. The beam measurement configuration is indicative of beam measurement by the UE 70 in an idle mode or an inactive mode. The transmitting unit 62 is configured to transmit the beam measurement configuration via a system message or dedicated signaling, such as RRC connection configuration signaling and RRC connection release signaling.

The beam measurement configuration includes at least one of: maximum number of beams measured for a cell; threshold for evaluating beam qualification; at least one of time and area for beam measurement. The threshold is one of an absolute threshold and a relative threshold.

The beam measurement configuration may further indicative of beam measurement results reporting by the UE 70 when the UE 70 enters into a connected mode. Accordingly, the beam measurement configuration includes: an indicator for indicating measurement of at least one beam and storage of beam measurement results corresponding to a cell. In this case, the receiving unit 64 is configured to receive beam measurement results from the UE 70, where beam measurement results are obtained by the UE 70 by measuring at least one beam according to the beam measurement configuration.

The beam measurement results received may include at least one of: beam related parameters; beam index of qualified beams for a cell; number of qualified beams for a cell. The beam related parameters comprise at least one of: reference signal received power, reference signal received quality, and signal to interference and noise ratio. The beam index is in a descending order of beam quality or beam strength.

In one implementation, the beam measurement configuration may further indicative of deletion of some or all beam measurement results by the UE 70.

UE

Implementations further provide a UE, which is applicable to perform the method for beam measurement provided herein, such as the method described in section UE side. FIG. 7 is a block diagram illustrating UE 70. The UE 70 includes a receiving unit 72 and a measuring unit 74. The UE 70 may further include a transmitting unit 76. Still possibly, the UE 70 may further include a memory or a buffer 78 or other equivalent means for storage purpose. The receiving unit 72 can be structured as a receiver, a receiving antenna, a receiving circuit, or other component equipped with a reception function. The transmitting unit 76 can be structured as a transmitter, a transmitting antenna, a transmitting circuit, or other component equipped with a transmission function. The measuring unit 74 can be a controller. In this context, the controller can control the beam measurement process.

The receiving unit 72 is configured to receive beam measurement configuration from a network device, such as the network device 60 illustrated in FIG. 6, where the beam measurement configuration is indicative of beam measurement by the UE 70 in an idle mode or an inactive mode. In one implementation, the receiving unit 72 has a decoding function, with which the receiving unit 72 can decode the beam measurement configuration to extract information carried therein.

In one implementation, the beam measurement configuration includes at least one of: maximum number of beams measured for a cell; threshold for evaluating beam qualification; at least one of time and area for beam measurement. The threshold is one of an absolute threshold and a relative threshold.

The measuring unit 74 is configured to perform measurement on at least one beam based on the beam measurement configuration given above, when the UE 70 in the idle mode or the inactive mode. According to the maximum number of beams measured for a cell, the measuring unit 74 can decide how many beams can be measured for a cell; according to the threshold for evaluating beam qualification, the measuring unit 74 can decide which beam is qualified, for example to be reported to the network device; according to the time and/or area for beam measurement, the measuring unit 74 can decide when and where to perform beam measurement.

In one implementation, the beam measurement configuration received is further indicative beam measurement results reporting by the UE 70 when the UE 70 enters into a connected mode. In one implementation, the beam measurement configuration includes at least one of: an indicator for indicating measurement of at least one beam and storage of beam measurement results corresponding to a cell; an indicator for indicating deletion of some or all beam measurement results.

In this case, the measuring unit 74 is further configured to store the beam measurement results in the buffer 78, for example for a certain period of time before the measurement result is reported or logged to the network. The measuring unit 74 can decide whether to store or delete some specific results according to the indicator for indicating measurement of at least one beam and storage of beam measurement results corresponding to a cell and/or the indicator for indicating deletion of some or all beam measurement results. Alternatively, the measuring unit 74 may further control to stop the beam measurement or replace an old beam measurement result with a new beam measurement result in the buffer 78 when buffer limit is exceeded. The indicator in the beam measurement configuration can be assigned with a higher priority than buffer settings.

In case that the beam measurement configuration is further indicative beam measurement results reporting by the UE when the UE enters into a connected mode, the transmitting unit 76 is configured to report beam measurement results obtained based on the beam measurement configuration to the network device for logged MDT, when the UE 70 enters into a connected mode. The transmitting unit 76 can obtain the beam measurement results from the measuring unit 74 directly, or read the beam measurement results from the buffer 78, which is not limited herein.

In one implementation, the transmitting unit 76 is further configured to notify the network device whether or which beam measurement results corresponding to a specific cell are available.

In one implementation, the beam measurement results comprise at least one of: beam related parameters; beam index of qualified beams for a cell; number of qualified beams for a cell. The beam related parameters comprise at least one of: RSRP, RSRQ, and SINR.

Functions of the receiving unit 72, the measuring unit 74, and the transmitting unit 76 can be integrated into a processor such as the processor 41 illustrated in FIG. 4, and can be done under control of a control unit such as a controller, as detailed below.

Interaction Between Network Device and UE

Figure 8:
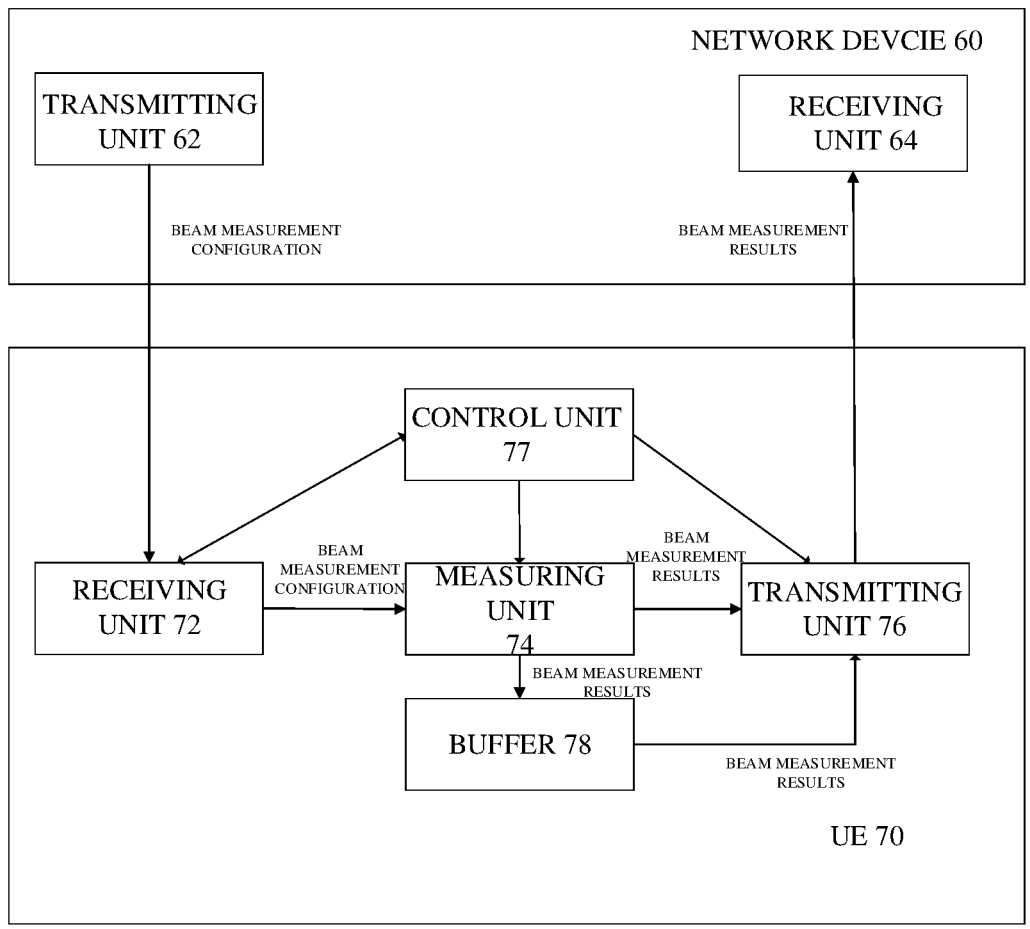
FIG. 8 is a block diagram illustrating interaction between the network device of FIG. 6 and the UE of FIG. 7.

Interaction between the network device 60 and the UE 70 will be further detailed in conjunction with FIG. 8. In the UE 70, a control unit 77, which is configured to control operations of the receiving unit 72, the measuring unit 74, and the transmitting unit 76, is introduced.

The transmitting unit 62 of the network device 60 transmits the beam measurement configuration to the UE 70. At the UE 70, the beam measurement configuration is received by the receiving unit 72, under control of the control unit for example. Then the receiving unit 72 will decode beam measurement configuration to extract information contained therein. Alternatively, the decoding can also be done at the control unit 77.

According to the beam measurement configuration, measuring unit 74 performs beam measurement to obtain beam measurement results.

The control unit 77 may further decide whether to store the beam measurement results according to the indicator for indicating measurement of at least one beam and storage of beam measurement results corresponding to a cell. For example, if the indicator is assigned with value 1, it indicates that the results should be stored; otherwise, storage is not required. Alternatively, the control unit 77 can decide storage of the beam measurement results according to preset settings. One possible situation is that, the control unit 77 notifies the measuring unit 74 to store the beam measurement results in the buffer 78.

The control unit 77 can decide whether to report the beam measurement results according to the beam measurement configuration. Once the control unit 77 confirms to report the beam measurement results, the transmitting unit 76 of the UE 70 will transmit the beam measurement results to the network device 60. The control unit 77 can determine whether some specific results should be deleted after transmission, according to an indicator for indicating deletion of some or all beam measurement results in the beam measurement configuration.

At the network device 60, the beam measurement results will be received by the receiving unit 64, which will then decode the beam measurement results to obtain beam related parameters, beam index of qualified beams for a cell, and/or number of qualified beams for a cell. Based on the information thus obtained, the network device 60 can configure the UE 70 more effectively.

For simplicity of explanation, in the network device 60 and the UE 70, details given in the foregoing sections are not repeated to avoid redundancy. Person skilled in the art should be noted that, the above sections or aspects of the present disclosure can be combined or substituted with each other without conflict. For example, the network device 60 described herein can be used separately or used together with the UE 70, and the method described with respect to the network device 60 can be implemented separately or together with the method described with respect to the UE 70.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for beam measurement, comprising:
   receiving, by a user equipment (UE), beam measurement configuration from a network device, and the beam measurement configuration being indicative of beam measurement and logging by the UE in an idle mode or an inactive mode; and
   performing, by the UE in the idle mode or the inactive mode, measuring on at least one beam based on the beam measurement configuration and logging beam measurement results in the UE,
   wherein the beam measurement configuration is further indicative of beam measurement results reporting by the UE when the UE enters a connected mode,
   wherein the beam measurement results comprise beam index of qualified beams for a cell,
   wherein the beam index is in a descending order in terms of beam strength, and
   wherein the beam measurement configuration contains
      an indicator for indicating deletion of some or all beam measurement results; wherein the method further comprises the following prior to the reporting:
      logging the beam measurement results; and
      replacing an old beam measurement result with a new beam measurement result when buffer limit is exceeded.

2. The method of claim 1, further comprising:
   reporting, by the UE in the connected mode, beam measurement results obtained based on the beam measurement configuration to the network device for logged minimization of drive tests (logged MDT).

3. The method of claim 2, wherein reporting the beam measurement results to the network device comprises:
   indicating whether or which beam measurement results corresponding to a specific cell are available.

4. A user equipment (UE), comprising: a processor and a transceiver, wherein
   the transceiver is configured to receive beam measurement configuration from a network device, the beam measurement configuration being indicative of beam measurement and logging by the UE in an idle mode or an inactive mode; and
   the processor is configured to perform measuring on at least one beam based on the beam measurement configuration and log beam measurement results in the UE when the UE in the idle mode or the inactive mode, the beam measurement configuration is further indicative of beam measurement results reporting by the UE when the UE enters into a connected mode; wherein the beam measurement results comprise beam index of qualified beams for a cell; wherein the beam index is in a descending order in terms of beam strength;
   the beam measurement results comprise beam index of qualified beams for a cell;
   the beam index is in a descending order in terms of beam strength; and
   the beam measurement configuration contains
      an indicator for indicating deletion of some or all beam measurement results; wherein the UE further comprises a buffer, and the processor is further configured to:
      log the beam measurement results in the buffer; and
      replace an old beam measurement result with a new beam measurement result in the buffer when buffer limit is exceeded.

5. The UE of claim 4, wherein the transceiver is further configured to report beam measurement results obtained based on the beam measurement configuration to the network device for logged minimization of drive tests (logged MDT) when the UE enters into the connected mode.

6. The UE of claim 5, wherein the transceiver is further configured to:
  notify the network device whether or which beam measurement results corresponding to a specific cell are available.

7. A network device, comprising: a processor and a transceiver, wherein
  the transceiver is configured to transmit a beam measurement configuration to user equipment (UE);
  the beam measurement configuration being indicative of beam measurement and logging by the UE in an idle mode or an inactive mode; and
  the beam measurement configuration is further indicative of beam measurement results reporting by the UE when the UE enters into a connected mode;
  the beam measurement results comprise: beam index of qualified beams for a cell;
  the beam index is in a descending order in terms of beam strength; and
  wherein the beam measurement configuration contains an indicator for indicating deletion of some or all beam measurement results.

8. The network device of claim 7, wherein the beam measurement configuration comprises at least one of:
  the maximum number of beams measured and/or logged for the cell;
  threshold for evaluating beam qualification for measurement and/or logging; or
  at least one of time or area for beam measurement and/or logging.

* * * * *